Figure 1:
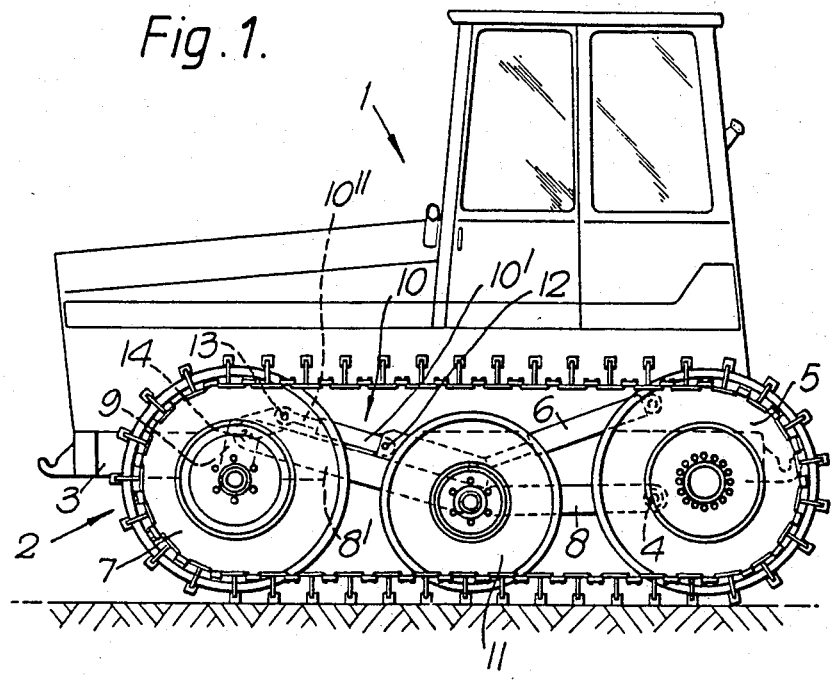

United States Patent [19]

Braathen

[11] Patent Number: 4,516,649
[45] Date of Patent: May 14, 1985

[54] TERRAIN-TRAVELLING MOTOR VEHICLE

[76] Inventor: Thor F. Braathen, N-3358 N. Eggedal, Norway

[21] Appl. No.: 457,108
[22] PCT Filed: May 11, 1982
[86] PCT No.: PCT/NO82/00026
§ 371 Date: Dec. 21, 1982
§ 102(e) Date: Dec. 21, 1982
[87] PCT Pub. No.: WO82/04022
PCT Pub. Date: Nov. 25, 1982

[30] Foreign Application Priority Data

May 11, 1981 [NO] Norway ................. 811604

[51] Int. Cl.³ ............................. B62D 55/30
[52] U.S. Cl. ..................... 180/9.1; 180/9.5; 180/9.54; 305/10; 305/29; 305/32
[58] Field of Search ............ 180/9.5, 9.54, 9.62, 180/9.64, 41, 9.1; 280/715; 305/10, 29, 30, 31, 32; 474/110, 117

[56] References Cited

U.S. PATENT DOCUMENTS

| 2,315,421 | 3/1943 | Heaslet | 305/32 |
| 2,613,116 | 10/1952 | Tutton | 305/31 |
| 2,654,639 | 10/1953 | Bombardier | 305/10 |
| 2,719,062 | 9/1955 | Arps | 305/30 |
| 3,289,779 | 12/1966 | Feucht | 180/9.5 |
| 3,842,926 | 10/1974 | Williams et al. | 180/41 X |

FOREIGN PATENT DOCUMENTS

| 89130 | 2/1957 | Norway . | |
| 91725 | 3/1958 | Norway . | |
| WO82/04022 | 11/1982 | PCT Int'l Appl. | 305/10 |
| 189170 | 4/1964 | Sweden . | |
| 199790 | 11/1965 | Sweden . | |
| 222817 | 9/1968 | Sweden . | |

Primary Examiner—Joseph F. Peters, Jr.
Assistant Examiner—Mitchell J. Hill
Attorney, Agent, or Firm—Young & Thompson

[57] ABSTRACT

A terrain-traveling motor vehicle (1) has twin caterpillar tracks and bogie assemblies (2) pivotally attached to the frame (3) of the vehicle, comprising a rear pair of drive wheels (5) mounted on the frame (3) of the vehicle and a pair of front wheels (7) each of which is supported on a pivotable belt-tensioning arm (9) disposed on the forward end of a bogie arm (8) found on each bogie assembly (2). The rearward end of the bogie arm (8) is supported by shaft journals (4) proximate to and in front of the center axis of the pair of rear wheels (5). The bogie arms (8) are movable in the vertical plane by hydraulic pressure cylinders (6) controllable from the cab of the vehicle for upward and downward pivoting of the bogie assemblies simultaneously or independently of each other, and for tautening the bogie tracks. The belt-tensioning arms (9) are movable independently of the bogie arms (8) by means of respective hydraulic pressure cylinders (10) which are pressurized at a desired adjustable pressure for maintaining a desired tautness in the belt during the pivoting movement of the bogie arm (8), as well as during the continual changes in the configuration of the lower perimeter of the belt which arise as the track passes over irregular ground terrain.

2 Claims, 2 Drawing Figures

TERRAIN-TRAVELLING MOTOR VEHICLE

The present invention relates to an assembly on a terrain-traveling motor vehicle having twin caterpillar tracks and bogie assemblies pivotally attached to the frame of the vehicle.

A terrain-traveling motor vehicle of this type is known from Swedish Pat. No. 184,059, which shows a vehicle with a pair of bogie assemblies, usually known as half-tracks, wherein the rear wheels are supported on the frame of the vehicle and the bogie arm for the bogie assembly is supported in front of and somewhat below the central axis of the rear wheels. The front wheel of the bogie assembly is supported on a belt-tensioning arm rotatably mounted on the forward end of the bogie arm. Each bogie assembly is provided with a hydraulic pressure cylinder, which is connected to said belt-tensioning arm and to the frame of the vehicle. When this pressure cylinder is pressurized and extended, the belt-tensioning arm is pivoted, whereby the belt is tautened about the front and rear wheels of the bogie assembly, and upon further extension of the pressure cylinder the bogie assembly is pivoted downwardly.

A drawback of the above arrangement is that it is not possible to maintain a certain desired tautness in the belt if at the same time as the bogie assembly, by means of the pressure cylinder acting upon the bogie arm, is pivoted up and down, the forward portion of the vehicle, which is provided with front wheels, is simultaneously raised by the front wheels lifting up from the ground. In such circumstances, the tautness of the belt is completely dependent upon the force that is needed to lift the forward part of the vehicle up from the ground, so that the degree of tautness may be greater than desired. In normal driving, on the other hand, where the bogies operate as half-tracks and the front wheels rest on the ground, it is possible by means of the pressure cylinder to maintain a desired track tautness, but it is not possible to pivot the bogie downwardly and thereby raise the vehicle without increasing the track tautness.

The object of the present invention is to provide a terrain-traveling vehicle in which the body of the vehicle, and optionally the bogie arms independently of each other, may be raised and lowered for maintaining a desired position of the vehicle body as the vehicle traverses irregular ground surfaces, without this affecting the tautness of the belt.

This object is achieved in accordance with the present invention by means of a second pressure cylinder which acts upon the belt-tensioning arm, a certain desired track tautness can be maintained by causing this pressure cylinder to be pressurized at a desired determined pressure. The track tautness can at all times be decreased or increased by regulating said pressure, independently of the ground surface conditions and independently of the up-and-down pivoting movements of the bogie assembly effected by means of the first pressure cylinder.

Figure 2:
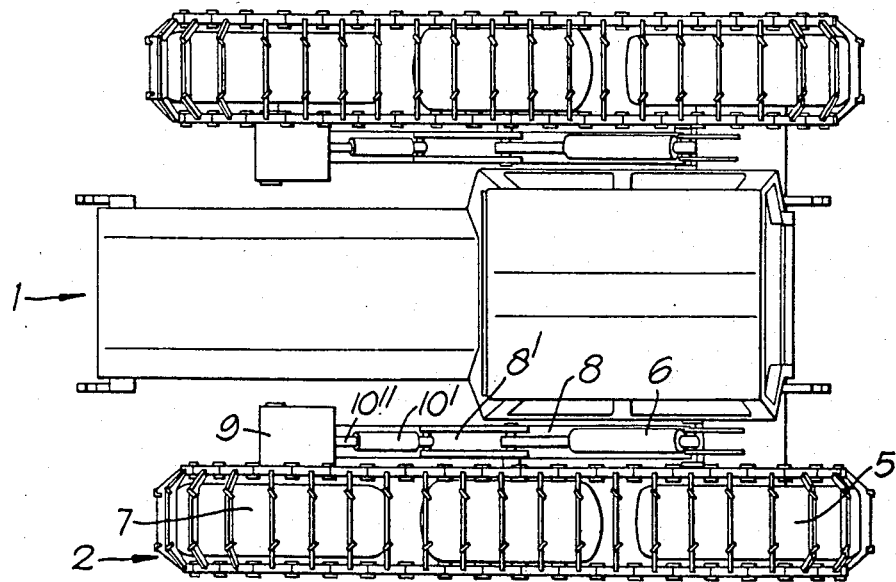

An embodiment example of a terrain-traveling motor vehicle in accordance with the invention will be described in greater detail in the following with reference to the accompanying drawings, wherein:

FIGS. 1 and 2, respectively, show the motor vehicle as seen from the side and from the top.

The terrain-traveling motor vehicle 1 is provided with twin caterpillar tracks and bogie assemblies 2, wherein the rear wheel 5 of each bogie assembly is supported in the frame of the vehicle 1 and the front wheel 7 of each assembly is supported on a respective pivotable arm 9 provided at the forward end of the bogie arm 8 found on each bogie assembly, the rearward end of said arm 8 being supported by means of shaft journals 4 proximate to and in front of the center of the rear wheels 5. The arm 9 is movable by means of a pressure cylinder 10 which is pressurized at a desired, adjustable pressure for maintaining a desired tautness in the bogie track during the pivoting movement of the bogie arm 8, as well as during the continual changes in the lower perimeter of the track as the vehicle drives over uneven terrain. The bogie assemblies 2 are independently and/or mutually pivotable and adjustable in relation to each other in the vertical plane by means of pressure cylinders 6 which are controlled from the cab of the vehicle. Approximately midway between the front and rear wheels 7,5, a track support wheel 11 is supported on the bogie arm 8, said wheel 11 preferably having a smaller diameter than the front and rear wheels 7,5 and resting against the lower perimeter of the belt. This means that when the bogie assemblies are in the normal position shown in FIG. 1, the lower perimeters of all of the wheels will rest against a level surface, i.e., the front and rear wheels 7,5 and the belt-supporting wheel 11 in each bogie assembly have a common tangent. Since the bogie arm 8 is eccentrically supported at 4 in relation to the central axis of the rear wheel 5, i.e., in front of and somewhat below said center axis, the bogie track will slacken when the bogie arm 8 is pivoted upwardly by means of the pressure cylinder 6. The slack is taken up by the belt-tensioning arm 9 which pivots the front wheel 7 forwardly, owing to the fact that the pressure cylinder 10 is pressurized at a desired pressure in a manner known per se; in this manner, the pressure cylinder 10 which is connected to the extension of the belt-tensioning arm 9 maintains the desired tautness in the track whether the belt slackens as the bogie arm 8 is pivoted upwardly or tautens as the bogie arm 8 pivots downwardly, or as the lower perimeter of the track is subjected to changes in configuration as the track passes over irregularities such as roots and rocks in the ground terrain.

The front and rear wheels 7 and 5 preferably have the same diameter, so that the vehicle, in reasonably even terrain, moves equally well forward or backwards. If the vehicle is driving over very rough terrain, the bogie assemblies can be provided upwardly and downwardly independently of each other, and thereby compensate for any disparity in level when traversing sloping terrain so that the frame and cab of the vehicle are maintained approximately level, and the bogie assemblies can also be raised and lowered as required for passing over small hills or depressions in the ground on one side or the other of the vehicle, as known per se.

In the practical configuration of the bogie arm 8 which is shown in FIG. 1, the arm is supported at 4 in the frame 3 of the vehicle at a height above the ground corresponding to the radius of the belt-tensioning wheel 11, whereby the rearward part of the bogie arm 8 is parallel with the ground surface in the normal driving position of the bogie assemblies shown in FIG. 1. From the middle portion of the arm, where the belt-tensioning wheel is mounted, the bogie arm 8 extends on an upward incline to a height above the ground approximately corresponding to the sum of the radius of the front wheel 7 and the length of the belt-tensioning arm 9, which extends approximately straight down from its support 14 at the forward end of the bogie arm 8.

The drive member or pressure cylinder 10 for pivoting the belt-tensioning arm 9 so as thereby to maintain the desired tautness of the belt consists of a hydraulic cylinder 10' with piston rod 10" arranged on the top side of the bogie arm 8, the end of the cylinder 10' being supported at 12 on the forward part 8' of the bogie arm, and the piston 10' piston rod 10" being supported at 13 on an extension of the belt-tensioning arm 9 which extends upwardly from the arm support 14 on the bogie arm 8.

I claim:

1. In a terrain-travelling motor vehicle (1) having twin caterpillar tracks and bogie assemblies (2) pivotally attached to the frame (3) of the vehicle and comprising a rear pair of drive wheels (5) mounted on the frame (3) of the vehicle, and a front pair of wheels (7) wherein each wheel of said front pair is supported on a pivotable belt-tensioning arm (9) at the forward end of a bogie arm (8) for each bogie assembly (2), the rearward end of said arm (8) being supported by means of shaft journals (4) proximate to and in front of the center axis of the rear pair of wheels (5), each belt-tensioning arm (9) and bogie arm (8) being movable in the vertical plane by means of a hydraulic pressure cylinder (6) for pivoting the bogie assemblies upwardly and downwardly simultaneously or independently of each other and for tautening the bogie tracks; the improvement in which each belt-tensioning arm (9) is movable independently of its respective bogie arm (8) by means of a hydraulic pressure cylinder (10) which is pressurized at a desired adjustable pressure for maintaining a desired tautness in the belt during the pivoting movement of the bogie arm (8), as well as during the continual changes in configuration of the lower perimeter of the track which occur as the vehicle drives over irregular ground terrain.

2. A motor vehicle according to claim 1, in which the pressure cylinder (10) is disposed on the top side of the bogie arm with one end thereof supported (at 12) on the forward part (8') of the bogie arm, and the other end thereof supported (at 13) on an extension of the belt-tensioning arm (9) which extends upwardly from the support (14) of said belt-tensioning arm on the bogie arm (8).

* * * * *